United States Patent
Buzbee et al.

(10) Patent No.: US 9,461,870 B2
(45) Date of Patent: Oct. 4, 2016

(54) SYSTEMS AND METHODS FOR PROVIDING THIRD-PARTY APPLICATION SPECIFIC STORAGE IN A CLOUD-BASED STORAGE SYSTEM

(71) Applicant: Google Inc., Mountain View, CA (US)

(72) Inventors: Thomas P. Buzbee, Boulder, CO (US); Michael J. Procopio, Boulder, CO (US); Ronald E. Schneider, Boulder, CO (US)

(73) Assignee: Google Inc., Mountain View, CA (US)

( * ) Notice: Subject to any disclaimer, the term of this patent is extended or adjusted under 35 U.S.C. 154(b) by 318 days.

(21) Appl. No.: 13/893,841

(22) Filed: May 14, 2013

(65) Prior Publication Data

US 2014/0344456 A1    Nov. 20, 2014

(51) Int. Cl.
*G06F 15/173* (2006.01)
*H04L 29/08* (2006.01)
*G06F 17/30* (2006.01)

(52) U.S. Cl.
CPC ... *H04L 29/08081* (2013.01); *G06F 17/30067* (2013.01); *H04L 29/08144* (2013.01)

(58) Field of Classification Search
CPC .................... G06F 17/30067; G06F 17/3061; G06F 17/30952
See application file for complete search history.

(56) References Cited

U.S. PATENT DOCUMENTS

| | | |
|---|---|---|
| 7,069,502 B2 | 6/2006 | Numata et al. |
| 7,197,510 B2 | 3/2007 | Abe et al. |
| 7,680,932 B2 | 3/2010 | Defaix et al. |
| 7,707,413 B2 | 4/2010 | Lunt et al. |
| 7,711,835 B2 | 5/2010 | Braddy et al. |
| 7,734,914 B1 | 6/2010 | Malasky |
| 7,761,796 B2 | 7/2010 | Faraday et al. |
| 7,779,113 B1 | 8/2010 | Samar |
| 7,818,678 B2 | 10/2010 | Massand |
| 7,818,679 B2 | 10/2010 | Clarke |
| 7,941,419 B2 | 5/2011 | Bhatkar et al. |
| 7,962,853 B2 | 6/2011 | Bedi et al. |
| 7,983,416 B2 | 7/2011 | Takashima et al. |
| 7,996,380 B2 | 8/2011 | Arrouye et al. |
| 8,015,496 B1 | 9/2011 | Rogers |
| 8,108,427 B2 | 1/2012 | Prahlad et al. |
| 8,131,723 B2 | 3/2012 | Sim-Tang |
| 8,151,204 B2 | 4/2012 | Lusen et al. |

(Continued)

FOREIGN PATENT DOCUMENTS

| | | |
|---|---|---|
| KR | 10-2010-0137323 | 12/2010 |
| KR | 10-2012-0010397 | 2/2012 |
| WO | WO 2010/054374 | 5/2010 |

OTHER PUBLICATIONS

International Search Report for Application No. PCT/US2014/037791, dated Oct. 8, 2014.

(Continued)

*Primary Examiner* — Esther B Henderson
(74) *Attorney, Agent, or Firm* — Ropes & Gray LLP (57) ABSTRACT

Systems and methods for providing a dedicated storage directory for third-party applications in a cloud storage system may include allocating a user specific and application specific directory for the third-party application and controlling access to the directory. The directory may be used to store application data associated with the third-party application. The directory is made available to the respective third-party application and may be hidden from view from other applications and users.

22 Claims, 7 Drawing Sheets

(56) References Cited

U.S. PATENT DOCUMENTS

| | | | |
|---|---|---|---|
| 8,190,987 B2 | 5/2012 | Campbell et al. | |
| 8,250,455 B2 | 8/2012 | Kadowaki et al. | |
| 8,341,708 B1 | 12/2012 | Eatough et al. | |
| 8,386,478 B2 | 2/2013 | Wang | |
| 8,555,160 B2 | 10/2013 | Hattori | |
| 2002/0105545 A1* | 8/2002 | Carter et al. | 345/752 |
| 2003/0126592 A1 | 7/2003 | Mishra et al. | |
| 2004/0205358 A1 | 10/2004 | Erickson | |
| 2005/0243760 A1 | 11/2005 | Yoshioka | |
| 2005/0273695 A1 | 12/2005 | Schnurr | |
| 2005/0289538 A1 | 12/2005 | Black-Ziegelbein et al. | |
| 2006/0005168 A1 | 1/2006 | Singh | |
| 2006/0070029 A1 | 3/2006 | Laborczfalvi et al. | |
| 2007/0226535 A1 | 9/2007 | Gokhale | |
| 2007/0254631 A1 | 11/2007 | Spooner | |
| 2008/0172720 A1 | 7/2008 | Botz et al. | |
| 2008/0189361 A1 | 8/2008 | Greschler et al. | |
| 2009/0083707 A1 | 3/2009 | Fujita et al. | |
| 2009/0210721 A1 | 8/2009 | Phillips | |
| 2009/0254580 A1 | 10/2009 | Laurion | |
| 2009/0288135 A1 | 11/2009 | Chang et al. | |
| 2010/0005529 A1 | 1/2010 | Hemade | |
| 2010/0063930 A1* | 3/2010 | Kenedy et al. | 705/51 |
| 2010/0095082 A1* | 4/2010 | Hull et al. | 711/171 |
| 2010/0161762 A1 | 6/2010 | Saxena | |
| 2010/0257578 A1 | 10/2010 | Shukla et al. | |
| 2010/0274910 A1 | 10/2010 | Ghanaie-Sichanie et al. | |
| 2010/0281528 A1 | 11/2010 | Hayton et al. | |
| 2011/0066668 A1 | 3/2011 | Guarraci | |
| 2011/0137979 A1 | 6/2011 | Seo et al. | |
| 2011/0179176 A1 | 7/2011 | Ravichandran et al. | |
| 2011/0202672 A1 | 8/2011 | Narayanaswamy et al. | |
| 2011/0231912 A1 | 9/2011 | Lee et al. | |
| 2011/0252038 A1 | 10/2011 | Schmidt et al. | |
| 2012/0005159 A1 | 1/2012 | Wang et al. | |
| 2012/0095878 A1 | 4/2012 | Feldman et al. | |
| 2012/0099135 A1 | 4/2012 | Ono | |
| 2012/0110646 A1 | 5/2012 | Ajitomi et al. | |
| 2012/0144202 A1 | 6/2012 | Counterman | |
| 2012/0144454 A1 | 6/2012 | Lee | |
| 2012/0254042 A1 | 10/2012 | Ludemann | |
| 2012/0259964 A1* | 10/2012 | Lin et al. | 709/223 |
| 2012/0266229 A1 | 10/2012 | Simone et al. | |
| 2013/0036455 A1 | 2/2013 | Bodi et al. | |
| 2013/0080268 A1 | 3/2013 | Gordon et al. | |
| 2013/0086585 A1 | 4/2013 | Huang et al. | |
| 2013/0086670 A1 | 4/2013 | Vangpat et al. | |
| 2013/0111336 A1 | 5/2013 | Dorman et al. | |
| 2013/0124606 A1 | 5/2013 | Carpenter et al. | |
| 2013/0144978 A1 | 6/2013 | Jain et al. | |
| 2013/0174237 A1 | 7/2013 | Zises | |
| 2013/0204849 A1 | 8/2013 | Chacko | |
| 2013/0254343 A1 | 9/2013 | Stevens et al. | |
| 2013/0318125 A1 | 11/2013 | Smith et al. | |
| 2014/0082071 A1 | 3/2014 | Rexer | |
| 2014/0108474 A1 | 4/2014 | David et al. | |
| 2014/0114672 A1 | 4/2014 | Wright et al. | |

OTHER PUBLICATIONS

Symantec Corporation: E-Security Begins With Sound Security Policies, Announcement Symantec, XX, XX, XP002265695, p. 10-11, Section "Who Writes the Policy?", Jun. 14, 2001, 23 pages.

Laferriere C. et al., "Authentication and Authorization Techniques in Distributed Systems," Security Technology, 1993 Security Technology, Proceedings, Institute of Electrical and Electronics Engineers 1993 International Carnahan Conference on Ottawa, Ont., Canada Oct. 13-15, 1993, New York, NY USA IEEE, Oct. 13, 1993, pp. 1647170, XP010124730.

Lampson B. et al., "Authentication in Distributed Systems: Theory and Practice," ACM Transactions on Computer Systems, Association for Computing Machinery, Inc. US, vol. 10, No. 4, pp. 265-310, Nov. 1992.

Beresford et al., "MockDroid: Trading Privacy for Application Functionality on Smartphones," HotMobile '11 Mar. 1-3, 2011, Phoenix, AZ, USA.

Bibi et al., "A Platform for Delivering Multimedia Presentations on Cultural Heritage," 2010 14th Panhellenic Conference on Informatics, pp. 175-179.

Ellis et al., "Concurrency Control in Groupware Systems," ACM 1989, pp. 399-407.

Nauman et al., "Apex: Extending Android Permission Model and Enforcement with User-Defined Runtime Constraints," ASIACCS '10 Apr. 13-16, 2010 Beijing, China.

Nichols et al., "High-Latency, Low-Bandwidth Windowing in the Jupiter Collaboration System," UIST '95. 8th Annual Symposium on User Interface Software and Technology. Proceedings of the ACM Symposium on User Interface SoftwareandTedmology, Nov. 14-17, 1995, pp. 111-120.

Peels et al., "Document Architecture and Text Formatting, ACM Transactions on Office Information Systems," 3 (4):347-369 (1985).

The OAuth 2.0 Authorization Protocol; draft leff-oauth-v2-24; Mar. 8, 2012.

Zhou et al., "Taming Information-Stealing Smartphone Applications (on Android)," LNCS 6740:93-107 (2011).

* cited by examiner

SYSTEMS AND METHODS FOR PROVIDING THIRD-PARTY APPLICATION SPECIFIC STORAGE IN A CLOUD-BASED STORAGE SYSTEM

TECHNICAL FIELD

In general, this disclosure relates to cloud storage systems, in particular, to systems and methods for providing application specific file system directories for third-party applications.

BACKGROUND

Cloud storage systems provide users with the ability to store electronic documents and other files on a remote network rather than on the user's local computer or computing device. Such systems allow users to access the remotely stored files from any device that is capable of connecting with the remote network, for example using a web browser over an Internet connection. Cloud storage systems can also provide users with a large amount of memory to store files so that users are not limited by the memory capacity of a particular client or device. To access a cloud storage system, a user typically logs into an account on the cloud storage system using a username and password. The cloud storage system provides a user interface for users to view, edit, and manage files stored on the system.

Third-party applications may be used with cloud storage systems to provide applications and services for user's files on the cloud storage system. Third-party applications may include their own proprietary file formats that may limit access to the specific applications or interfaces by the cloud storage system and other third-party applications. In order for the third-party application to integrate with the cloud storage system, certain application information may be exchanged with the cloud storage system. Handling such application specific information in a streamlined fashion is desirable for efficient integration of third-party applications with cloud storage systems.

SUMMARY

Thus a need exists in the art to provide a unified system for a third-party application to integrate with a cloud storage system. Systems and methods described herein provide dedicated data storage for a third-party application that is integrated in a cloud storage system to provide access to third-party application supported files.

In one aspect, systems and methods provide dedicated storage for a third-party application in a cloud storage system, by receiving, using a processor, a file for storage in a cloud storage system, wherein the file is associated with a third-party application and a user of the cloud storage system, identifying the third-party application, automatically allocating a directory for the identified third-party application and the user; and providing access to the directory for the identified third-party application to the third-party application. The directory is configured to store application data for the third-party application. The directory may be associated with a user and also hidden from the user. The directory may be assigned a reference link based on application data for the third-party application and a user identifier. Files for other users and other third-party applications may have respective directories allocated for use by the respective other third-party applications. Access to a file in the directory is authenticated for the requesting third-party application and respective user. In an aspect, if the third-party application is no longer available to the user, the user may be prompted to delete contents of the directory. In another aspect, the user may be presented with information for the directory and be provided an option to modify contents of the directory.

In another aspect, systems and methods provide support for a third-party application in a cloud storage system, by allocating a directory for a third-party application, associating the directory with a user of the cloud storage system, receiving configuration data for the third-party application, storing the configuration data in the directory; and hiding the directory from view by the user.

BRIEF DESCRIPTION OF THE DRAWINGS

The methods and systems may be better understood from the following illustrative description with reference to the following drawings in which.

DETAILED DESCRIPTION

To provide an overall understanding of the systems and methods described herein, certain illustrative embodiments will now be described, including systems and methods for a cloud storage system capable of allocating an application specific directory for a third-party application. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. In particular, a server, processor, or system as used herein may be a single computing device or multiple computing devices working collectively and in which the storage of data and the execution of functions are spread out amongst the various computing devices.

Aspects of the systems and methods described herein provide an application manager, for example, in a cloud storage system, that is capable of providing and allocating an application specific file system directory for a third-party application. Cloud storage systems may be used to store electronic document or files. Those cloud stored files are accessible from the cloud storage via a network from any client or computing device. As such, a user of a cloud storage system is not limited by storage capacity of a local device, or the availability of the local device. Different kinds of third-party applications may be used for the files that the user wishes to store on the cloud storage system. Since most applications have their own proprietary formats, integration of the third-party applications in another environment can require different application-specific solutions.

One way to improve efficient handling of third-party application files on a cloud storage system is to provide a third-party application file system directory on the cloud storage system that is accessible and used only by the third-party application. The third-party application directory may be allocated for each user of a third-party application on the cloud storage system. The third-party application directory may be used to store data relevant to the third-party application or originated by the third-party application, for example, application configuration data, default file types, user preferences, file state information, temporary files, file logs, or other data for the third-party application. In some implementations, such data is preferably protected from access by other applications, and also from the user. For example, if the user sees a data directory for the third-party application and modifies it, the contents of the directory may be unusable by the third-party application. Accordingly, the third-party application directory may be made hidden or un-modifiable to the user.

The third-party application directory may be provided on a cloud storage system that is accessible by any number of client computers and other electronic devices that are capable of connecting with remote networks, for example the Internet. In some implementations, the third-party application may be locally installed on a client computer or other device. In other implementations, the cloud storage system may be connected to the third-party application server or otherwise make the third-party application available to a cloud storage system user. Some examples of third-party applications or services include word processing applications, photo and video storing and sharing services, spreadsheet applications, graphic design services, presentation applications, database applications, gaming and entertainment services, music services, e-mail services, cloud storage services, and a variety of other categories.

Figure 1:
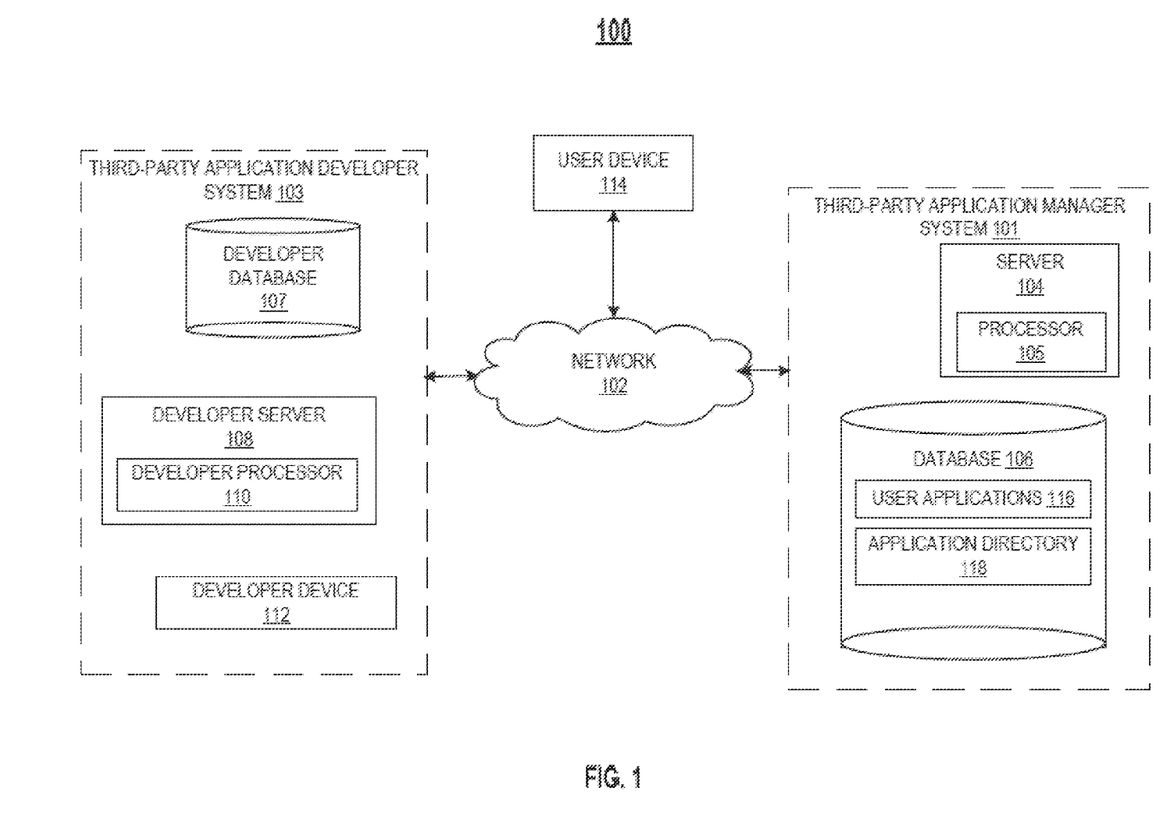
FIG. 1 is a block diagram of a computerized system for providing application-specific directories for third-party applications in accordance with an implementation described herein.

FIG. 1 depicts an example of a network and database structure that may be used to implement the systems and methods herein. FIG. 1 is a block diagram of a computerized system 100 for providing application specific directories. The system 100 includes a third-party application manager system 101, a user device 114, and a third-party application developer system 103. The third-party application manager system 101 includes a server 104 including a processor 105 and a database 106 that stores data, including a user's web data, and data related to a list of user applications 116, and application directory 118. As used herein, the term "processor" or "computing device" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. An illustrative computing device 700, which may be used to implement any of the processors and servers described herein, is described in detail with reference to FIG. 7. As used herein, "developer device" and "user device" include, without limitation, any suitable combination of one or more input devices (e.g., keypads, touch screens, trackballs, voice recognition systems, etc.) and/or one or more output devices (e.g., visual displays, speakers, tactile displays, printing devices, etc.). As used herein, "server" includes, without limitation, any suitable combination of one or more devices configured with hardware, firmware, and software to carry out one or more of the computerized techniques described herein. Only one third-party application manager system 101, one user device 114, and one third-party application developer system 103 are shown in FIG. 1 to avoid complicating the drawing. However, in general, the system 100 can support multiple third-party application manager systems, third-party developer systems, servers, databases, developer devices, and user devices.

The third-party application manager system 101 allows for third-party application developers to associate third-party application data directories 118 with a user. In particular, the third-party application developer may have certain default data to store in a third-party application data directory that may be used to integrate use of a third-party application file in another environment, for example, a cloud storage environment.

In one implementation, the third-party application manager system 101 is a part of a cloud storage system, which is a file hosting system that allows users to store, retrieve, and modify data via one or more user devices such as the user device 114. This data may be referred to as a user's web data. As an example, the cloud storage system 101 may be stored on a single server system or in a distributed system. In particular, the cloud storage system 101 may use cloud storage to store user data.

The database 106 stores several types of data. In particular, the database 106 stores data associated with user applications 116 and application directories 118. The user applications 116 may be stored as a list of applications associated with a user. For example, the set of user applications 116 may correspond to a list of all applications that the user has ever used to interact with a file, or with which the user has selected to be associated. As an example, when the third-party application manager system 101 is a part of a cloud storage system, the user's web data includes a set of files with various application formats. In this case, the list of user applications 116 may correspond to a set of applications that the user has used to access any file in the user's web data, or a set of applications that are configured to support any file within the user's web data. In general, the list of user applications 116 may be associated with the user, or a set of files associated with the user.

In addition, the database 106 also stores an application directory 118 that is associated with a particular user as well as the user application 116. The application directory 118 may be part of a data object family associated with the respective user application 116 and/or user. In some implementations, any user files related to the third-party application may also be included in the data object family. An alias associated with the third-party application may be assigned to the data object family and used for identification and authentication purposes as well as in a reference link for mapping the file system directory.

The third-party application developer system 103 communicates with the third-party application manager system 101 over the network 102 to initiate use of the third-party application. As depicted in FIG. 1, the developer system 103 includes a developer database 107, a developer server 108, a developer processor 110, and a developer device 112. The developer database 107 may store third-party application files or data. In an example, the developer system 103 is associated with a particular third-party application, and the developer system 103 is configured to transmit a request to the third-party application manager system 101 to allocate an application specific directory. If the third-party application manager system 101 grants the request, the database 106 is updated with the particular third-party application a respective third-party application directory.

The third-party application directory may be allocated per-user and per-application. In some implementations the third-party application directory 118 may not be visible in a user interface for accessing user files, for example, in the cloud storage system. In other implementations, the third-party application directory 118 may be visible to the user, but the contents of the directory may not be modifiable. To the third-party application developer system 103, however, the application directory 118 is visible and available as any other directory. The application directory 118 may be made available using existing API methods using, for example, a standard identifier. The third-party application manager system 101 may receive the identifier from the developer system 103 to encode respective user and application identifiers. The third-party application directory 118 is generally created during the first use of the third-party application by the user. The third-party application directory 118 and its contents may be assigned certain authorization fields that are used to ensure that any requesting or accessing application is authorized to access the directory. Typically, only one third-party application is able to access its own application specific directory. The authorization fields may also be copied from a parent directory for the application to every directory and file that is created using the third-party application.

Figure 2A:
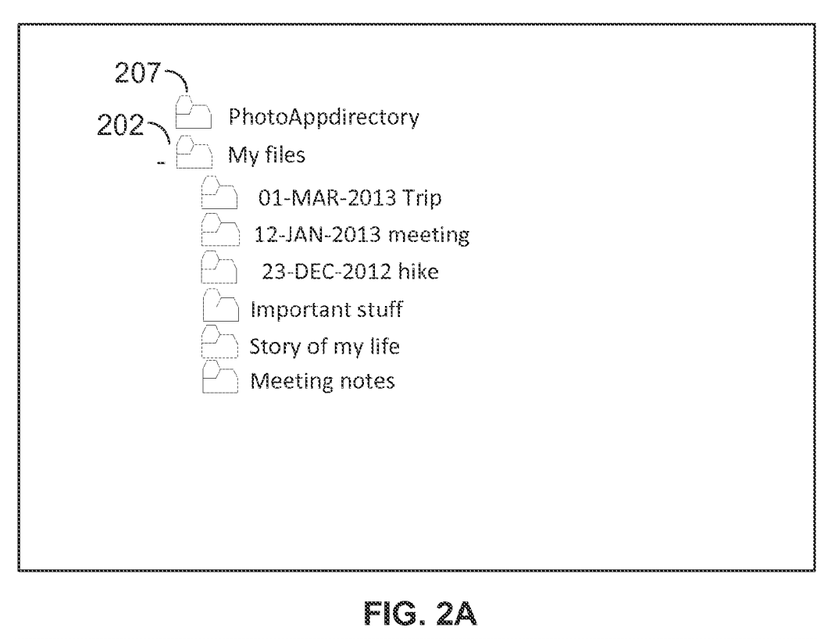
FIGS. 2A and 2B show a storage hierarchy for user files in a cloud storage system in accordance with an implementation as described herein.

One example of a file manager interface is shown in FIG. 2A. As shown, a user may have certain files stored on a cloud storage system, for example my files 202. The user may have one or more third-party applications installed or available to the user, for example a PhotoApp 206 and a WritingApp 208. Each of the applications may have an application directory, for example, PhotoAppDirectory 207. The user's third-party application directories may include any third-party application data, for example temporary files, log data, configuration data, or other application-originated or application-specific data. For example, a writing application directory may include user preferences for document margins, views or fonts. A photography application directory may include user preferences for filter types. In a games application directory, game state information may be stored. The view shown in FIG. 2A may be one that is visible by the third-party application. In the example of FIG. 2A, the view is for the PhotoApp application, which shows the PhotoAppDirectory 207. A corresponding WritingAppDirectory would exist, however, it would not be viewable by another third-party application. User files may also be shown in any hierarchy, minimized or maximized, and include metadata for the file. In general, any file associated with a particular application will have an authorization field that is propagated from the parent or top-level directory.

Figure 2B:
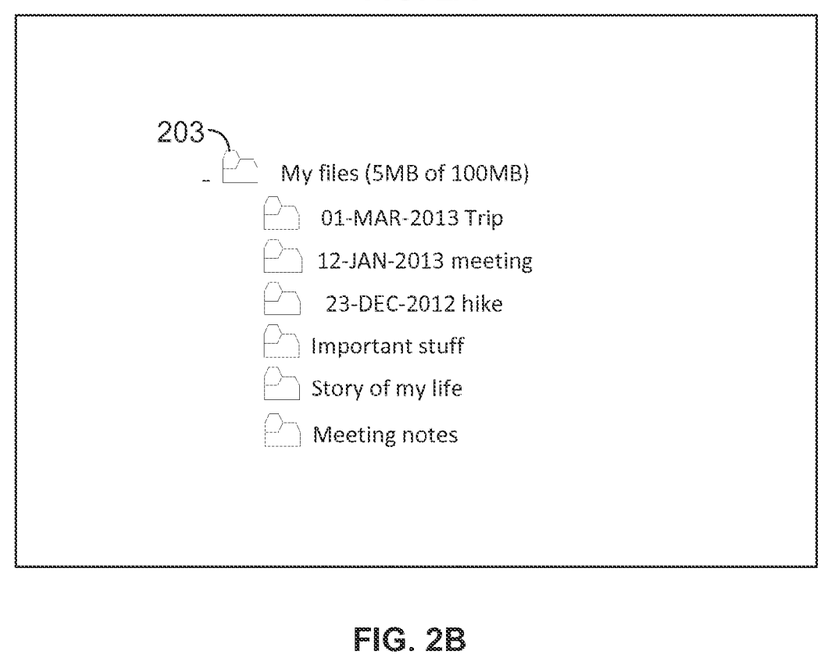

An example of a user's view of their files is shown in FIG. 2B. As shown, a user may have files, such as my files 703 and include a list of each of their respective files. The view shown in FIG. 2B is simply illustrative of a simple file manager user interface. As shown in FIG. 2B, there is no third-party application directory shown to the user. Instead, only the user files are visible to the user. In some implementations, hiding the data directory is useful to avoid the user being confused by unknown or unrecognizable files, which could lead to the user modifying the data directories rendering the contents unusable by the third-party application. In some implementations, a third-party application data directory is visible to the user (not shown in FIG. 2B), but the directory is not modifiable by the user. In such implementation, the visible third-party-application data directory may include information indicating the storage volume utilized by the directory. In another implementation, the contents of the directory may be deleted or modified, for example, when the third-party application is no longer available or used by the user. In such implementations, the directory may continue to exist, without any content, for use if the third-party application becomes available to the user again.

Figure 3:
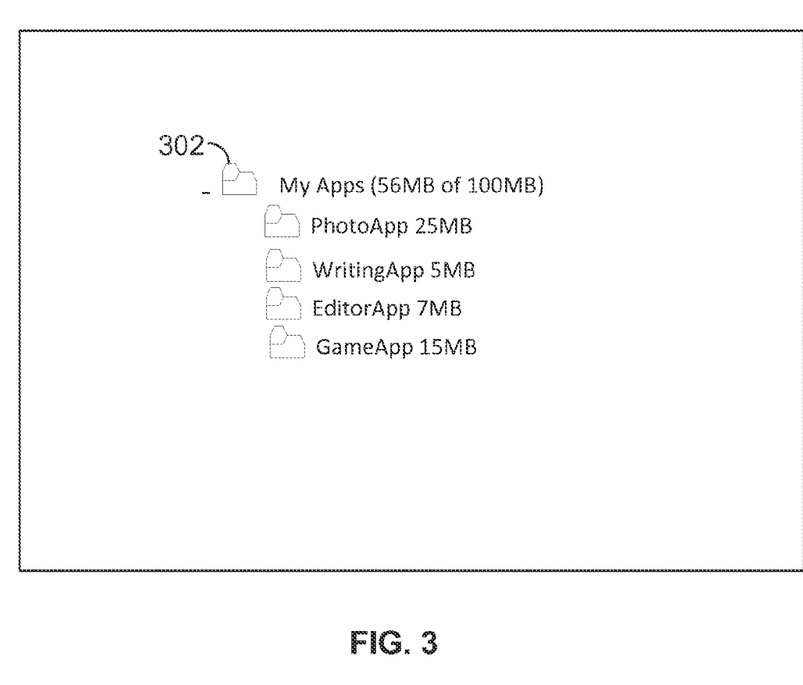
FIG. 3 shows a user view of user files in a cloud storage system in accordance with an implementation as described herein.

Turning to FIG. 3, which depicts a user interface for application management, a user may wish to view a list of applications associated with the user. Such a list of my apps 703 may include any applications available to the user. In addition, storage volumes utilized by each application may also be visible to the user. Total application storage volume information may include all application data associated with the user, including data in certain third-party application directories which may not be included in the application totals. As shown, in some implementations, the user may be able to see total storage utilization, but not specific application directory storage volumes.

Figure 4:
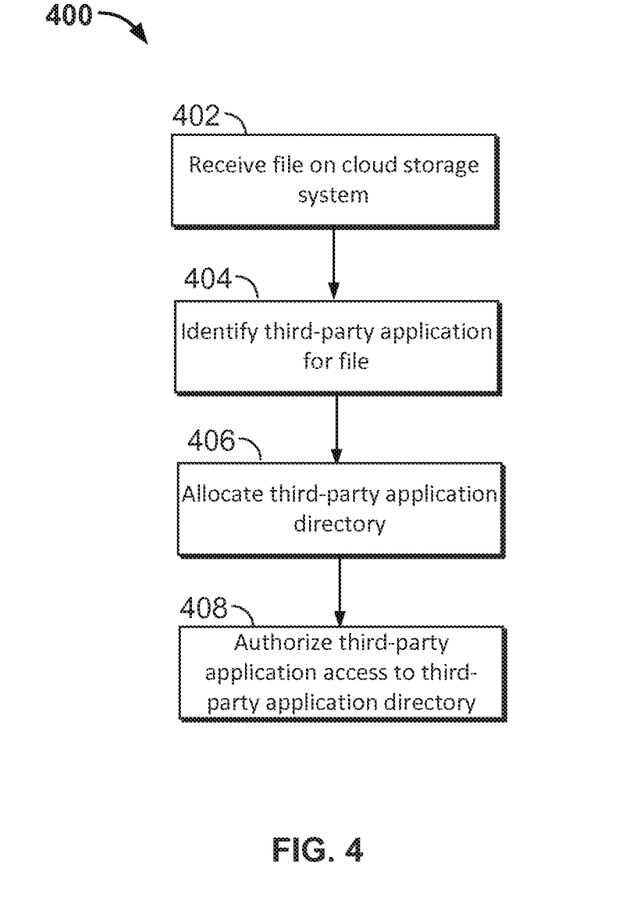
FIG. 4 shows a method for allocating a third-party application directory in accordance with an implementation as described herein.
Figure 5:
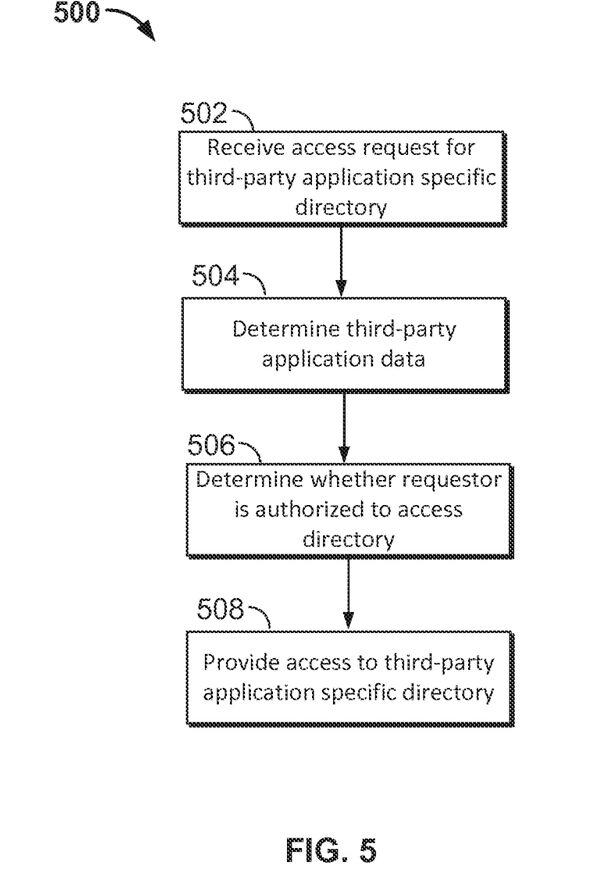
FIG. 5 shows a method for providing access to a third-party application directory in accordance with an implementation as described herein.
Figure 6:
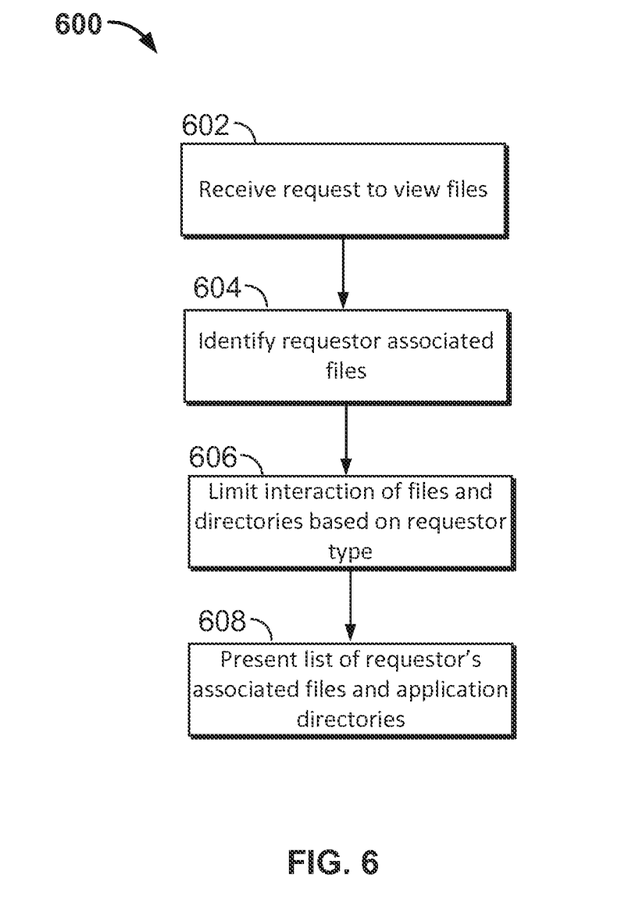
FIG. 6 shows a method for providing a user view of user files in a cloud storage system in accordance with an implementation as described herein.

FIGS. 4-6 are flowcharts of methods that may be used by a processor such as processor 105 for performing the techniques described herein. In particular, FIG. 4 is a flowchart of a high level method 400 for allocating an application specific directory, in accordance with an illustrative implementation. As shown, FIG. 4 includes the steps of receiving a file on a cloud storage system (step 402), identifying a third-party application for the file (step 404), allocating a third-party application directory (step 406) and authorizing third-party application access to the third-party application directory (step 408).

Method 400 may begin at step 402, when a file is received on a cloud storage system. In some implementations, the file may be received when a user seeks to store the file on a cloud storage system, or otherwise interact with the file using the cloud storage system. A processor for the cloud storage system, or a third-party application manager system may identify a third-party application associated with the file at step 404. The identification process may include consulting a list of third-party applications known to the cloud storage system, determining application information that is associated with the file, or may require communication with a third-party application developer. An allocation of a third-party application directory may be made by the processor for the identified third-party application at step 406. The third-party application directory may be a data directory that is used to store particular data for the third-party application, for example, configuration data, and which is stored in association with the respective user in the cloud storage system. At step 408 the processor authorizes the third-party application to access the third-party application directory. The authorization process may include communicating authenticating information between the processor and the third-party application. Authentication information may be included in the third-party application directory. The third-party application directory as well as its contents may be assigned an authorization field so that only the specific third-party application may access the directory. The authorization fields are copied from a parent file to each file when they are added.

FIG. 5 depicts a method for authenticating a third-party application requestor, in accordance with an implementation. Method 500 includes receiving a request to access a third-party application specific directory (step 502), determining application data (step 504), determining that the requestor is authorized to access the directory (step 506) and providing access to the authorized third-party application to the third-party application specific directory (step 508).

Authentication of a third-party application, in particular, a requesting third-party application may be performed using a processor in the cloud storage system or the third-party application manager system. A third-party application may request access to its third-party application directory on the cloud storage system by communicating such request to the cloud storage system, generally in connection with a user accessing a file. At step 502, a request is received to access a third-party directory. The processor may obtain certain information from the third-party application as well as the third-party directory to determine application data, at step 504. Typically, the third-party directory will have an authorization field that is associated with the application data. That authorization field is also included in all of the respective application files so that the application is explicitly authorized to access its files on the cloud storage system. The application data of the application may be matched to the third-party application directory at step 506 to determine whether the requestor application is authorized to access the directory. Application data, alias information, application identifiers and other authentication information may be stored in a database accessible to the processor, for example, database 106. If the application data and identifiers match, the processor will provide access to the third-party application specific directory at step 508.

A user is generally freely available to manage his or her files stored on the cloud storage system. However, as mentioned herein, application-specific data directories should not be modified by the user. Although application-specific directories can contain any kind of data relevant to an application, such data is typically not useful on a standalone basis. As such, user modifications may be made out of context, or without knowledge of the data in the directory. A user may find it useful to know that some data directory exists that has a storage volume that goes towards the user's storage quota, and so an indication of the size of a data file may be made known to the user. In some implementations, the contents of the data directory are not modifiable by the user. A method for limiting access to an application specific directory is shown in FIG. 6.

FIG. 6 depicts a method 600 for providing a file manager based on a requestor, according to an implementation. As shown, method 600 includes receiving a request to view files (step 602), identify requestor associated files (step 604), limit interaction of files and directories based on the requestor type (step 606), and present a list of requestor's associated files and application directories (step 608).

The steps of method 600 may be performed by a processor in the cloud storage system. At step 602, a requestor may select to view the requestor's files by making a selection in a user device, a developer device, or other device to view an interface for a file manager or an application manager. The processor may receive the request to view the user's files and search its database for any available files associated with the requestor. The files may be identified at step 604 by the processor using known techniques for identifying files associated with a particular user. The processor will also obtain information about the user type, for example, whether the user is an individual, or an application developer. Based on the user type, the processor will limit the interaction of the files and the application directories at step 606. For example, an individual user may be limited from viewing the contents of a third-party application directory, or seeing such directory at all. In some implementations, the individual user may see that there is a directory that has a certain stored amount. In such implementation, the user may clear the contents of the directory, or make limited modifications to the directory contents. For an application developer user, however, such limitations would not be applied to its respective third-party application specific directory. Other third-party application directories would not be available for view or interaction by a different third-party application user. At step 608, the processor will present a list of the requestor's file and directories, including the limitations based on the requestor type, to the requestor using for example, a file manager user interface display.

Figure 7:
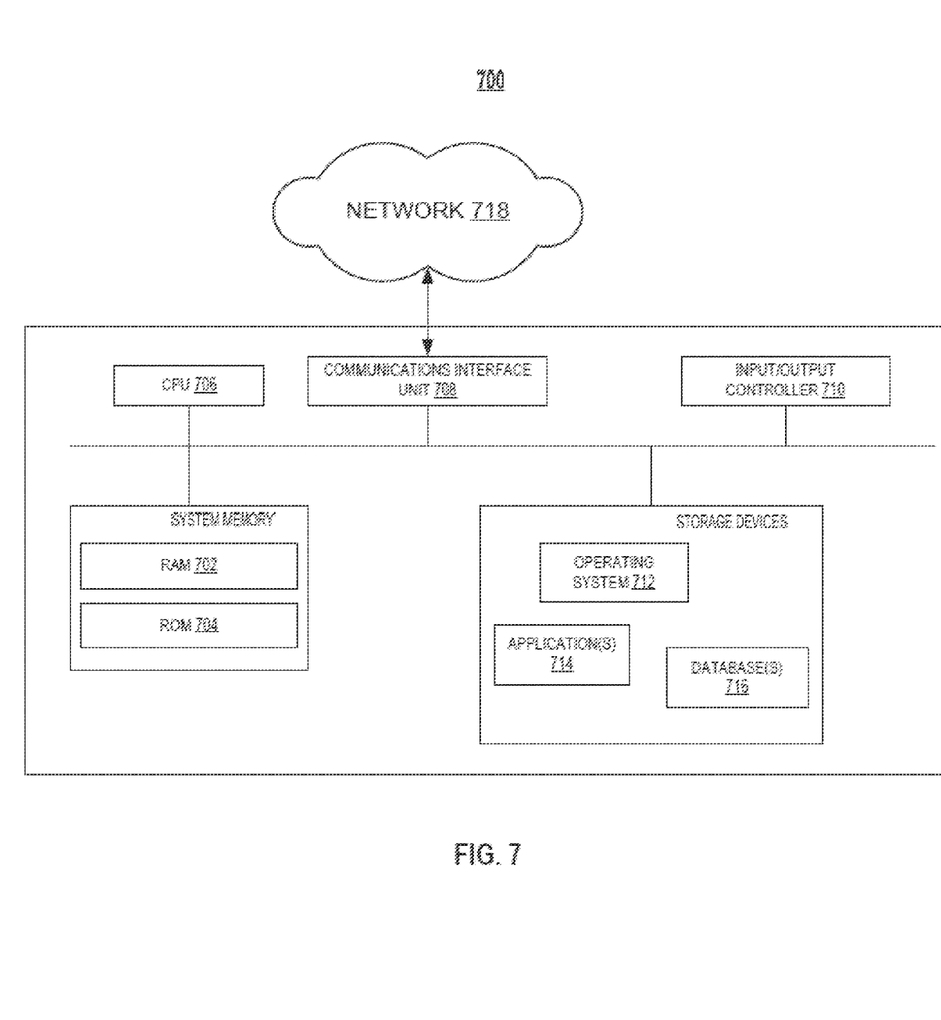
FIG. 7 is a block diagram of a computing device for performing any of the processes described herein, in accordance with an illustrative implementation.

The components of the system 100 of FIG. 1 may be arranged, distributed, and combined in any of a number of ways. FIG. 7 is a block diagram of a computing device, such as any of the components of the system of FIG. 1, for performing any of the processes described herein, according to an illustrative embodiment. Each of the components of these systems may be implemented on one or more computing devices 700. In certain aspects, a plurality of the components of these systems may be included within one computing device 700. In certain implementations, a component and a storage device may be implemented across several computing devices 700.

The computing device 700 comprises at least one communications interface unit, an input/output controller 710, system memory, and one or more data storage devices. The system memory includes at least one random access memory (RAM 702) and at least one read-only memory (ROM 704). All of these elements are in communication with a central processing unit (CPU 706) to facilitate the operation of the computing device 700. The computing device 700 may be configured in many different ways. For example, the computing device 700 may be a conventional standalone computer or alternatively, the functions of computing device 700 may be distributed across multiple computer systems and architectures. In FIG. 7, the computing device 700 is linked, via network or local network, to other servers or systems.

The computing device 700 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 708 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 706 comprises a processor, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers or client terminals in the network 718.

The CPU 706 is also in communication with the data storage device. The data storage device may comprise an appropriate combination of magnetic, optical or semiconductor memory, and may include, for example, RAM 702, ROM 704, flash drive, an optical disc such as a compact disc or a hard disk or drive. The CPU 706 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 706 may be connected to the data storage device via the communications interface unit 708. The CPU 706 may be configured to perform one or more particular processing functions.

The data storage device may store, for example, (i) an operating system 712 for the computing device 700; (ii) one or more applications 714 (e.g., computer program code or a computer program product) adapted to direct the CPU 706 in accordance with the systems and methods described here, and particularly in accordance with the processes described in detail with regard to the CPU 706; or (iii) database(s) 716 adapted to store information that may be utilized to store information required by the program.

The operating system 712 and applications 714 may be stored, for example, in a compressed, an uncompiled and an encrypted format, and may include computer program code. The instructions of the program may be read into a main memory of the processor from a computer-readable medium other than the data storage device, such as from the ROM 704 or from the RAM 702. While execution of sequences of instructions in the program causes the CPU 706 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to associating an application with one or more file formats using a third-party application manager system as described herein. The program also may include program elements such as an operating system 712, a database management system and "device drivers" that allow the processor to interface with computer peripheral devices (e.g., a video display, a keyboard, a computer mouse, etc.) via the input/output controller 710.

The term "computer-readable medium" as used herein refers to any non-transitory medium that provides or participates in providing instructions to the processor of the computing device 700 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 706 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 700 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

It will be apparent to one of ordinary skill in the art that aspects of the systems and methods described herein may be implemented in many different forms of software, firmware, and hardware in the implementations illustrated in the figures. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for providing dedicated storage for a third-party application in a cloud storage system, the method comprising:
   receiving, by a processor, a file for storage in a cloud storage system, wherein the file is associated with a third-party application and a user of the cloud storage system;
   identifying by the processor, the third-party application;
   automatically allocating, by the processor, a directory for the identified third-party application and the user, wherein the directory is associated with a first authorization field corresponding to the third-party application and the user;
   storing the file in the directory;
   copying the first authorization field from the directory to the file;
   providing, by the processor, access to the directory for the identified third-party application to the third-party application, when the third-party application matches authentication information in the first authorization field; and
   hiding the file from a view of the user, wherein the file includes application-specific data from the third-party application.

2. The method of claim 1 further comprising assigning, by the processor, a reference link to the directory, the reference link based on application data associated with the third-party application and an identifier for the user.

3. The method of claim 1 further comprising receiving at the processor, an access request from a second user to access a second file associated with a second third-party application, and associating a second directory with the second third-party application and the second user.

4. The method of claim 1 further comprising receiving at the processor, a request from the third-party application to access the file in the directory; and determining whether the third-party application is authorized to access the file by comparing the third-party application to the authentication information in the first authorization field of the file.

5. The method of claim 4 wherein determining whether the third-party application is authorized to access the file in the directory comprises determining that the third-party application matches authentication information in the first authorization field and that the third-party application is associated with the user identified in the authentication information.

6. The method of claim 1 wherein the directory is configured to store application data for the third-party application, wherein the stored application data is not modifiable by the user.

7. The method of claim 1 wherein the directory is configured to store user specified data for the third-party application.

8. The method of claim 1 further comprising: detecting by the processor that the third-party application is no longer available to the user, and prompting the user to delete contents of the directory.

9. The method of claim 1 further comprising:
presenting, to the user, directory information that includes a storage volume utilized by the directory that includes files visible in the view of the user and files hidden from the view of the user, and
providing, to the user, an option to modify the files visible in the view of the user.

10. A system for providing dedicated storage for a third-party application in a cloud storage system, the system comprising a processor and a memory accessible via a network, the processor configured to:
receive a file for storage in the memory, wherein the file is associated with a third-party application and a user of the cloud storage system;
identify the third-party application;
automatically allocate a directory for the identified third-party application and the user,. wherein the directory is associated with a first authorization field corresponding to the third-party application and the user;
store the file in the directory;
copy the first authorization field from the directory to the file;
provide access to the directory for the identified third-party application to the third-party application, when the third-party application matches authentication information in the first authorization field; and
hide the file from a view of the user, wherein the file includes application-specific data from the third-party application.

11. The system of claim 10 wherein the processor is further configured to assign a reference link to the directory, the reference link based on application data associated with the third-party application and an identifier for the user.

12. The system of claim 10 wherein the processor is further configured to receive an access request from a second user to access a second file associated with a second third-party application, and associating the second directory with the second third-party application and the second user.

13. The system of claim 10 wherein the processor is further configured to receive an access request to the file in the directory by the third-party application; and
determine whether the third-party application is authorized to access the file by comparing the third-party application to the authentication information in the first authorization field of the file.

14. The system of claim 13 wherein determining whether the third-party application is authorized to access the file in the directory comprises determining that the third-party application matches authentication information in the first authorization field and that the third-party application is associated with the user identified in the authentication information.

15. The system of claim 10 wherein the directory is configured to store application data for the third-party application, wherein the stored application data is not modifiable by the user.

16. The system of claim 10 wherein the directory is configured to store user specified data for the third-party application.

17. The system of claim 10 wherein the processor is further configured to detect that the third party application is no longer available to the user, and prompt the user to delete contents of the directory.

18. The system of claim 10 wherein the processor is further configured to:
present, to the user, directory information that includes a storage volume utilized by the directory that includes files visible in the view of the user and files hidden from the view of the user; and
provide, to the user, an option to modify the files visible in the view of the user.

19. A method for supporting a third-party application in a cloud storage system, the method comprising:
allocating, by a processor, a directory for a third-party application, wherein the directory is associated with a first authorization field corresponding to the third-party application and a user of the cloud storage system;
associating, by the processor, the directory with the user of the cloud storage system;
receiving, by the processor, application data for the third-party application;
storing the application data in the directory;
copying the first authorization field from the directory to the application data; and hiding contents of the directory from view by the user.

20. A system for supporting a third-party application in a cloud storage system, the system comprising a processor and a memory accessible via a network, the processor configured to:
allocate a directory for a third-party application, wherein the directory is associated with a first authorization field corresponding to the third-party application and a user of the cloud storage system;
associate the directory with the user of the cloud storage system;
receive application data for the third-party application;
store the application data in the directory;
copy the first authorization field from the directory to the application data; and hide contents of the directory from view by the user.

21. The method of claim 19, wherein the contents of the directory hidden from a view of the user include at least a portion of the application data.

22. The system of claim 20, wherein the contents of the directory hidden from a view of the user include at least a portion of the application data.

* * * * *